3,021,355
Patented Feb. 13, 1962

3,021,355
PROCESS FOR THE PRODUCTION OF UNSATURATED NITRILE COMPOUNDS OF THE VITAMIN A SERIES
Karl Eiter, Koln, and Ernst Truscheit, Leverkusen, Germany, assignors to Farbenfabriken Bayer Aktiengesellschaft, Leverkusen, Germany, a corporation of Germany
No Drawing. Filed May 28, 1958, Ser. No. 738,275
Claims priority, application Germany June 1, 1957
9 Claims. (Cl. 260—464)

This invention relates to a novel process for the production of unsaturated compounds of the vitamin A series.

It is known that unsaturated nitriles of the vitamin A series can be obtained by various processes (cf. Huisman, "Rec. Trav. Chim." Pays-Bas 71, 899 (1952)), L. Weisler et al. United States patent specification No. 2,583,194, British patent specification No. 684,757). The products are, however, not obtained in satisfactory yields by these processes.

It is an object of the present invention to provide a novel process for the production of unsaturated compounds, especially nitriles, of the vitamin A series. Another object is to provide these compounds in an economical process. Still more objects will appear hereinafter.

In accordance with the presence invention it has been found that unsaturated compounds are easily obtained if carbonyl compounds of the vitamin A series, are reacted with halogen nitriles of the general formula $$X-CH_2-(C=CH)_n-C\equiv N$$
$$\phantom{X-CH_2-(}R$$

in which X represents chlorine, bromine or iodine, n represents the number 0 or 1 and R represents hydrogen or a low alklyl radical, the reaction taking place under the conditions of the Reformatsky reaction, and water is split off from the hydroxynitriles formed.

Carbonyl compounds suitable for use in the process of the invention are for example β-ionone, β-cyclocitral, β-ionylidenacetaldehyde ("β-C₁₅-aldehyde"), β-ionylidenacetone ("β-C₁₆-ketone") or 1-(2′,6′,6′-trimethyl cyclohexene-1′-yl)-3-methyl-1,3,5-octatriene-7-one ("β-C₁₈-ketone").

Examples of suitable halogen nitriles of the constitution indicated in Formula I are chloracetonitrile, bromacetonitrile, iodoacetonitrile, γ-bromocrotonic acid nitrile and β-methyl-γ-bromocrotonic acid nitrile.

The first step of the reaction, which is the reaction of the carbonyl compound with the halogen nitrile, takes place under the known conditions of the Reformatsky reaction in that, for example, the carbonyl compound is dissolved in an inert solvent such as for example tetrahydrofuran, dioxane, benzene, toluene or mixtures of these solvents with diethyl ether. Thereafter the necessary zinc is added, e.g. as powdered zinc or as flowers of zinc or as zinc turnings, and then the halogen nitrile is introduced. The process can be carried out also in such a manner that there is added to the zinc part of the mixture of the reaction components with the solvent. Upon starting of the reaction the remaining parts of the mixture of the reaction components are then added in portions. After the working up of the reaction mixture which can be carried out in the usual manner e.g. by adding a cold aqueous ammonium chloride solution or cold dilute acids, such as hydrochloric acid, sulfuric acid, phosphoric acid or acetic acid, hydroxynitriles are obtained which, when β-ionone is used as ketone, can be represented by the following formula:

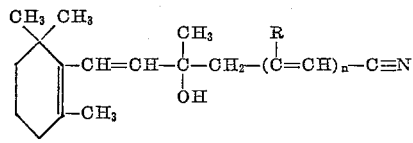

in which n and R have the significances indicated above. Water can then be split off from these compounds, whereby compounds of the following formula:

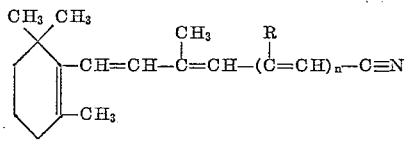

which contain another double bond are obtained. This operation of splitting off water can for example be carried out by treating the hydroxynitrile in an inert organic solvent, such for example as benzene, toluene, xylene or petroleum ether, for a period of time with agents splitting off water, such for example as iodine, glacial acetic acid and sodium acetate, phosphorus oxychloride or phosphorus pentoxide with or without basic additives such as pyridine or quinoline. This operation of splitting off water can surprisingly be effected without a retro-ionylidene rearrangement taking place when using carbonyl compounds of the vitamin A series, which rearrangement it is known leads to biologically ineffective substances of the retro-vitamin A series (cf. W. Oroshnik et al. "Journal of the American Chemical Society" 74, 295, 3807, (1952); H. O. Huisman et al., "Rec. Trav. Chim." Pays-Bas 71, 899 (1952); C. D. Robeson et al. "Journal of the American Chemical Society" 77, 4111 (1955)). It is remarkable that upon saponifying the unsaturated nitriles obtained by the process of the invention the corresponding unsaturated all-trans-acids are obtained.

The invention is further illustrated by the following examples:

EXAMPLE 1

(a) *1-(2′,6′,6′-trimethyl-cyclohexen-1′-yl)-3-methyl-3-hydroxy-1-pentene-5-acid nitrile* (=β-ionolacetonitrile)

9.9 grams of active powdered zinc and 19.2 grams of β-ionone dissolved in 70 ml. of absolute tetrahydrofuran are placed in a 3-necked flask with a stirrer, reflux condenser, dropping funnel and gas admission tube and heated under nitrogen to boiling point; 18 grams of bromacetonitrile dissolved in 70 ml. of absolute tetrahydrofuran are now added dropwise, while heating is stopped after the reaction commences, which is immediately, or only gentle heating is continued. After all the halogen nitrile has been introduced, heating is continued for a few minutes, the yellow solution is cooled and decomposed with ice-cold ammonium chloride solution. Extraction with ether is quickly carried out in a separating funnel or extractor, the ether extract is washed neutral with water and, after drying, the solvent is evaporated on a water bath in vacuo. There remains 22 grams of an oily oxynitrile, which distils as a yellowish viscous oil in a test distillation in high vacuum at 0.001 mm. Hg and 130–140° C. and has an absorption maximum at 42,000 cm.⁻¹ in the ultra-violet. The infra-red spectrum shows one OH band, no CO band and a very strong CH=CH-trans band at 970 cm.⁻¹.

*Analysis.*—$C_{15}H_{23}NO$: Calculated: C=77.20; H=9.94; O=6.86; N=6.00. Found: C=76.94, 76.95; H=9.84, 9.89; O=7.33; N=6.43.

Instead of the bromacetonitrile there can be used also the chloracetonitrile or the iodoacetonitrile.

Furthermore there can be used instead of the tetrahydrofuran another inert diluent e.g. benzene or a mixture of dioxane and diethyl ether.

(b) *1-(2',6',6'-trimethyl-cyclohexene-1'-yl)-3-methyl-1,3-pentadiene-5-acid nitrile (=β-ionylidene-acetonitrile)*

44 grams of β-ionolacetonitrile are dissolved in 500 ml. of absolute benzene and mixed under nitrogen with a solution of 1.6 grams of iodine in 100 ml. of absolute benzene; the mixture is boiled for 2 hours under reflux, cooled, the benzenic phase is extracted by shaking several times with N-sodium thiosulfate solution and water, dried over sodium sulfate and the solvent is evaporated in vacuo. There remain 39 grams of an unsaturated nitrile, which can be further processed as such without further purification. Under high vacuum, the substance (B.P.$_{0.001\text{ mm}}$ 95–100° C.) distils over as a light yellow thickish oil. The infra-red spectrum shows a completely homogeneous nitrile band so that, also in conformity with the ultra-violet absorption (33,000 cm.$^{-1}$ 40,000 cm.$^{-1}$), retro-fractions are not present even in small quantities.

The operation of splitting off water from the β-ionolacetonitrile can also take place in the following way:

9.5 grams of β-ionolacetonitrile are dissolved in 60 ml. of absolute benzene and 15 grams of absolute pyridine are added while stirring and introducing nitrogen; a mixture of 60 ml. of absolute benzene, 15 grams of absolute pyridine and 12 grams of POCl$_3$ is added to this solution. The mixture is heated for 1 hour on a boiling water bath, poured onto finely crushed ice and extracted with ether. The ethereal benzene phase is washed with a 10% sulfuric solution, water, NaHCO$_3$ solution and again with water, dried, the solvent is evaporated in vacuo and the residue distilled at 0.001 mm. Hg. 8 grams of β-ionylidene acetonitrile are obtained as a light yellow thickish oil at an air bath temperature of 110–120° C.

No OH band can be detected in the infra-red spectrum, but a sharp —C≡N band and an intensive CH=CH-trans band can be detected at 970 cm.$^{-1}$, this being evidence that the product does not in the main belong to the "retro-series." In the ultra-violet spectrum, the maximum is at 35,000 cm.$^{-1}$ This displacement of the maximum as compared with the maximum of 33,500 cm.$^{-1}$ known from the literature originates from slight quantities of retro-compound formed when the water is split off.

*Analysis.*—C$_{15}$H$_{21}$N: Calculated: C=83.66; H=9.83; N=6.50. Found: C=84.11, 84.31; H=10.06, 10.18; N=5.84.

EXAMPLE 2

(a) *1-(2',6',6'-trimethyl-cyclohexene-1'-yl)-3-methyl-3-hydroxy-1,5-heptadiene-7-acid nitrile*

About ⅕ of a mixture of 19.2 grams (0.1 mol) of β-ionone and 21.9 grams (0.15 mol) of γ-bromocrotonic acid nitrile dissolved in 130 ml. of absolute ether is applied to a suspension of 10.5 grams of active powdered zinc in 50 ml. of absolute tetrahydrofurane under nitrogen and while stirring and heated until the violent reaction is initiated; thereafter, without external heating, the remainder of the aforementioned mixture is run in at a rate such that the contents of the flask boil violently. After all the mixture has been added, heating is continued for another 30 minutes at boiling point, then an ice-cold 5% hydrochloric acid solution is added to the complete mixture, which is extracted several times with ether. The combined ethereal phases are washed several times with a 5% hydrochloric acid solution and then water, dried over sodium sulfate and the solvent is evaporated in vacuo. The hydroxynitrile which is obtained can be used without further purification for the subsequently described operation of splitting off water.

Instead of the ether there can be used another inert diluent such as benzene, toluene or dioxane.

(b) *1-(2',6',6'-trimethyl-cyclohexene-1'-yl)-3-methyl-1,3,5-heptatriene-7-acid nitrile (=γ-(β-ionylidene)-crotonic nitrile)*

10 grams of the crude hydroxynitrile are dissolved in 80 ml. of absolute benzene and heated with 2 ml. of phosphorus oxychloride in a stream of nitrogen for 1 hour on a boiling water bath; the cooled solution is diluted with ether and washed with water, sodium bicarbonate solution and water. After drying over sodium sulfate, the solvent is evaporated in vacuo, and the residue distilled under high vacuum. At B.P.$_{0.001\text{ mm}}$ and an air bath temperature of 120–130° C. the γ-(β-ionylidene)-crotonic-nitrile which has a main absorption band at 322.6 mμ (ε=13,200) in the ultra-violet spectrum is obtained.

The γ-(β-ionylidene)-crotonic nitrile can also be obtained in the following way:

10 grams of the crude hydroxynitrile are heated with 12 grams of anhydrous oxalic acid for two hours in vacuo (12 mm. Hg) at 80–100° C. Thereafter, the cooled reaction mixture is taken up in ether and the ethereal solution is shaken with water, aqueous sodium carbonate solution and then again with water. After drying over sodium sulfate, the ether is evaporated at reduced pressure and the residue distilled under high vacuum as indicated above. The product obtained has the same properties.

For the purpose of further purification, the crude product obtained by this process si chromatographed on aluminum oxide (according to Brockmann). In this way, analytically pure γ-(β-ionylidene)-crotonic nitrile with a B.P.$_{0.001\text{ mm}}$ of 120° C. (air bath temperature) is obtained: λ$_{max}$=329 mμ (ε=20,000).

*Analysis.*—C$_{17}$H$_{23}$N (241.38).: Calculated: C=84.59%, H=9.61%, N=5.80%. Found: C=84.37%, H=9.69%, N=5.77%.

EXAMPLE 3

2.1 grams of powdered zinc are added while stirring and in a nitrogen atmosphere to a solution of 7.5 grams of trans-C$_{18}$-ketone (1(2',6',6'-trimethyl-cyclohexene-1'-yl)-3-methyl-1,3,5-octatriene-7-one) in 25 ml. of absolute tetrahydrofuran. The mixture is heated to about 70° C. and 3.8 grams of freshly distilled bromacetonitrile in 20 ml. of absolute tetrahydrofuran are run in dropwise; a violent reaction is started and the contents of the flask are kept at boiling point for 15 minutes after introducing the nitrile. After cooling, the dark red contents of the flask are decomposed with saturated ammonium chloride solution, extracted with ether, the ethereal solution is washed with water, dried and evaporated in vacuo. There is left 8.7 grams of practically pure 1-(2',6',6'-trimethylcyclohexene - 1' - yl) - 3,7 - dimethyl - 7 - hydroxy - 1,3,5-nonatriene-9-acid nitrile, which distils over as a thick orange-yellow oil under high vacuum at 0.001 mm. Hg and an air bath temperature of 160–180° C.

7 grams of the hydroxynitrile obtained above are dissolved in 50 ml. of absolute benzene, mixed with 50 mg. of iodine and heated under nitrogen and under reflux for 2 hours. After cooling, the contents of the flask are washed with sodium thiosulfate solution and water, dried and the benzene solution is evaporated in vacuo. The residue is distilled under high vacuum at 0.001 mm. Hg and an air bath temperature of 160–170° C.; a thick orange-yellow oil distils over, which shows a clear ultra-violet absorption spectrum with λ$_{max}$ 352 mμ (log ε 4.37), while no OH band and a sharp α,β-unsaturated C≡N-band could be detected in the infra-red spectrum. The compound is 1 - (2',6',6' - trimethylcyclohexene - 1' - yl)-3,7-dimethyl-1,3,5,7-nonatetraene-9-acid nitrile.

By saponifying the nitrile with alcoholic potassium hydroxide there is obtained all-trans-vitamin A acid; M.P. 186–187° C.

EXAMPLE 4

In a three-necked flask, 8.6 grams of powdered zinc are heated in a nitrogen atmosphere while stirring with about ⅕ of a mixture of 15.2 grams of β-cyclocitral, 15 grams of bromacetonitrile and 70 ml. of absolute tetrahydrofurane until the violent reaction is initiated. Without external heating the remainder of the mixture is added dropwise, while stirring constantly, so that the contents of the flask boil violently. On completing the dropwise addition, the powdered zinc is almost completely consumed and the contents of the flask are heated for approximately another 10 minutes on a reflux condenser to boiling point to complete the reaction. Thereafter, the reaction mixture is cooled to about 0° C. and cold-saturated aqueous ammonium chloride solution is added. The mixture is extracted with ether several times, the combined ether extracts are washed with ammonium chloride solution and water and the solution is dried over sodium sulfate. After evaporating the solvent under reduced pressure, there is obtained a substantially quantitative yield (about 19 grams) of 1-(2',6',6'-trimethyl-cyclohexene-1'-yl)-1-hydroxy-3-propionitrile as a yellowish oily liquid, which distils over as a colorless viscous substance at 0.001 mm. Hg and 100° C. (air bath temperature). The infra-red absorption spectrum shows a highly pronounced OH band at 3450 cm.$^{-1}$, as well as the absorption characteristic for $\alpha,\beta$-saturated nitriles at 2250 cm.$^{-1}$ Analysis.—$C_{12}H_{19}ON$ (molecular weight: 193.29): Calculated: C=74.56%, H=9.91%, N=7.25%. Found: C=74.74%, H=9.77%, N=7.63%.

3 grams of the 1-(2',6',6'-trimethyl-cyclohexene-1'-yl)-1-hydroxy-3-propionitrile are left to stand with 15 ml. of acetic anhydride and 0.1 to 0.2 ml. of trifluor-acetic acid for 20–30 hours at room temperature. The solution is thereafter poured into iced water and sodium bicarbonate is added until there is a weak alkaline reaction. The reaction product is thereafter extracted with ether, the ethereal solution is washed with sodium bicarbonate solution and water and dried over sodium sulfate. After evaporating the solvent, there are obtained 3.6 grams (=95% of the theoretical yield) of 1-(2',6',6'-trimethyl-cyclohexene-1'-yl)-1-acetoxy-3-propionitrile as a colorless liquid with a B.P.$_{0.001\ mm.}$ 80–85° C. (air bath temperature). The infra-red absorption spectrum, which no longer shows any OH band, has inter alia a C=O band at 1748 cm.$^{-1}$ and a C≡N band at 2250 cm.$^{-1}$ 3 grams of the product thus obtained are dissolved without further purification in 10 ml. of absolute ethanol. This solution is combined with a solution of 3.2 grams of sodium in 50 ml. of absolute ethanol. Sodium acetate soon separates out in the form of a gel. The mixture is left for some hours at room temperature and then the major part of the ethanol is evaporated under reduced pressure. Approximately 150 ml. of water are added thereto, the oil which is formed is extracted with ether, the ethereal solution is washed with water and dried over sodium sulfate. After evaporating the ether, there are left 2.1 grams (=94% of the theoretical yield) of 1-(2',6',6'-trimethyl-cyclohexen-1'-yl)-1-propene-3-acid nitrile ($\beta$-cyclocitrylidene acetonitrile) as a colorless thinly liquid substance with a B.P.$_{0.001\ mm}$ 55–60° C. (air bath temperature). The infra-red absorption spectrum, which now no longer shows any C=O band has the absorption at 963 cm.$^{-1}$ which is characteristic for the symmetrically substituted —CH=CH-trans-double bond. The strongly pronounced absorption of the C≡N bond is at 2222 cm.$^{-1}$ in the range characteristic for $\alpha,\beta$-unsaturated nitrile. The ultra-violet absorption maximum is at 278 m$\mu$ (log $\epsilon$=3.89).

Analysis.—$C_{12}H_{17}N$ (molecular weight: 175.27): Calculated: C=82.23%, H=9.78%, N=7.99%. Found: C=82.19%, H=9.73%, N=7.91%.

EXAMPLE 5

In a three-necked flask 12 grams of powdered zinc are heated in a nitrogen atmosphere while stirring with about ⅓ of a mixture of 22.5 grams of $\beta$-cyclocitral, 28 grams of $\gamma$-brom-$\beta$-methyl crotonitrile and 50 ml. of absolute tetrahydrofurane until the reaction is initiated. By slightly heating and while stirring constantly the remainder of the mixture is added dropwise. Thereafter the mixture is boiled 10–15 minutes under reflux and subsequently cooled to about 0° C., diluted with ether and shaken with a cold 2% sulfuric acid solution. The ethereal phase is shaken several times with a 2% sulfuric acid until the sulfuric acid does not show any yellow coloration. After washing the ethereal phase with sodium bicarbonate solution and water it is dried over sodium sulfate. Then the solvent is evaporated under reduced pressure. Thus, 13 grams of a yellow-brown oily residue are obtained which are purified chromatographically on aluminum oxide (according to Brockmann). Thus, there are obtained besides 4–5 grams of unreacted $\beta$-cyclocitral about 5,5 grams of 1-(2',6',6'-trimethyl cyclohexene-1'-yl)-1-hydroxy-3-methyl-3-pentene-5-acid nitrile which distils over as a viscous, almost colorless liquid in a high vacuum at 0.001 mm. Hg at 120° C. (air bath temperature). The ultra-violet absorption spectrum shows a maximum at 210 m$\mu$ (log $\epsilon$=4.18). The infra-red spectrum shows a strong OH band at 3450 cm.$^{-1}$ as well as the absorption characteristic for $\alpha,\beta$-unsaturated nitrile at 2218 cm.$^{-1}$ 3 grams of the hydroxynitrile obtained are left to stand with 15 ml. of acetic anhydride and 0.1 to 0.2 ml. of trifluor acetic acid for 15–20 hours at room temperature. The solution is thereafter poured into ice water and sodium bicarbonate is added until there is a weak alkaline reaction. The reaction product is thereafter extracted with ether, the ethereal solution is washed with sodium-bicarbonate solution and water and dried over sodium sulfate. After evaporating the ether under diminished pressure, there are obtained 3.3 grams (93% of the theoretical yield) of 1-(2',6',6'-trimethyl cyclohexene-1'-yl)-1-acetoxy-3-methyl-3-pentene-5-acid nitrile as a slightly yellow viscous oily liquid with a B.P.$_{0.001\ mm}$ 110–120° C. (air bath temperature). The ultra-violet absorption spectrum shows a maximum at 210 m$\mu$ (log $\epsilon$=4.42). The infra-red absorption spectrum which no longer shows any OH-band has a carbonyl band at 1730 cm.$^{-1}$ The compound contains the C≡N band as the starting material at 2218 cm.$^{-1}$ Analysis.—$C_{17}H_{25}O_2N$ (molecular weight: 275.38): Calculated: C=74.14%, H=9.15%. Found: C=74.65%, H=8.76%.

To 3 grams of the product thus obtained dissolved in 45 ml. of absolute ethanol is added within 40 minutes a solution of 0.3 gram of sodium dissolved in 30 ml. of absolute methanol while stirring at a temperature of −10° C. and under a nitrogen atmosphere. The reaction mixture is kept for 2 hours at −10° C. and thereafter 5–6 hours at room temperature. Thereafter there are added 2 ml. of acetic acid and the ethanol is evaporated under diminished pressure. To the residue there is added water and the reaction product is extracted with ether. The ethereal solution is washed with sodium bicarbonate solution and water and then dried over sodium sulfate. Upon evaporating the ether, 2.2 grams (=94% of the theoretical yield) of 1-(2',6',6'-trimethylcyclohexene-1'-yl)-3-methyl-1,3-pentadiene-5-acid nitrile ($\beta$-ionyliden acetonitrile) are obtained as a yellowish oily liquid; B.P.$_{0.001\ mm.}$ 100–110° C. The infra-red absorption spectrum does not show a carbonyl band but shows the absorption of a C≡N group at 2200 cm.$^{-1}$ The infrared absorption spectrum shows furthermore an absorption at 968 cm.$^{-1}$ which is characteristic for the symmetrically substituted CH=CH-trans-ethylene bond. The ultra-violet absorption spectrum shows maximae at 304 m$\mu$ (log $\epsilon$=4.08) which is in accordance with the literature (see H. O. Huisman, A. Smit, S. Vromen and L. G. M. Fisscher, "Rec. trav. chim.," Pays-Bas 71, 913 (1952)).

We claim:

1. A process for the production of unsaturated compounds of the vitamin A series, which comprises the steps of (1) reacting in an inert organic solvent medium selected from the group consisting of tetrahydrofurane, dioxane, benzene, toluene, xylene and mixtures of these solvents with ether, a halogen nitrile of the general formula

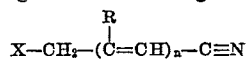

wherein X represents a member selected from the group consisting of chlorine, bromine and iodine, R represents a member selected from the group consisting of hydrogen and a lower alkyl group and n is one of 0 and 1 with a member selected from the group consisting of β-ionone, β-cyclocitral, β-ionylidenacetaldehyde, β-ionylidenacetone and 1-(2′,6′,6′-trimethyl cyclohexene-1′-yl)-3-methyl-1,3,5-octatriene-7-one, in the presence of zinc; (2) reacting the cooled reaction mixture thus obtained with an aqueous solution of an acid to thereby produce the corresponding hydroxy nitrile; (3) contacting the thus produced hydroxy nitrile with a dehydrating agent under splitting off of water without any retro-ionylidene rearrangement taking place; and (4) recovering the unsaturated compound of a vitamin A series thereby produced.

2. Process according to claim 1, wherein said acid is a member selected from the group consisting of hydrochloric acid, sulfuric acid, acetic acid and phosphoric acid.

3. Process according to claim 1, wherein said dehydrating agent is a member selected from the group consisting of phosphorus pentoxide, phosphorus oxychloride, iodine, glacial acetic acid and sodium acetate.

4. A process for the production of 1-(2′,6′,6′-trimethyl-cyclohexene-1′-yl)-3-methyl-1-propene-3-acid nitrile, which comprises the steps of (1) reacting in the presence of tetrahydrofurane as solvent β-cyclocitral and bromacetonitrile in the further presence of zinc to produce 1-(2′,6′,6′-trimethyl-cyclohexene-1′-yl)-1-hydroxy-3-propionitrile, (2) reacting the product thus obtained with a mixture of acetic anhydride and trifluoracetic acid to produce 1-(2′,6′,6′-trimethyl-cyclohexene-1′-yl)-1-acetoxy-3-propionitrile; (3) dehydrating the thus produced 1-(2′,6′,6′-trimethyl-cyclohexene-1′-yl)-1-acetoxy-3-propionitrile by contacting the same with a solution of sodium in absolute ethanol without any retro-ionylidene rearrangement taking place and (4) recovering the thus produced 1-(2′,6′,6′-trimethyl-cyclohexene-1′-yl)-3-methyl-1-propene-3-acid nitrile.

5. Process according to claim 1, wherein the reacting of said halogen nitrile and said group member is carried out, substantially in the absence of oxygen and moisture.

6. Process according to claim 5, wherein the splitting off of water is carried out, in the absence of oxygen.

7. Process according to claim 1 in which said halogen nitrile is a member selected from the group consisting of bromoacetonitrile, γ-bromocrotonic acid nitrile and γ-bromo-β-methylcrotonic acid nitrile.

8. 1-(2′,6′,6′-trimethyl-cyclohexene-1′-yl)-1-propene-3-acid nitrile, B.P. 55–60° C./0.001 mm.

9. 1-(2′,6′,6′-trimethyl-cyclohexene-1-yl)-1-acetoxy-3-methyl-3-pentene-5-acid nitrile, B.P. 110–120° C./0.001 mm.

References Cited in the file of this patent
UNITED STATES PATENTS

| | | |
|---|---|---|
| 2,369,158 | Milas | Feb. 13, 1945 |
| 2,583,194 | Weisler | Jan. 22, 1952 |
| 2,761,878 | Huisman | Sept. 4, 1956 |

FOREIGN PATENTS

| | | |
|---|---|---|
| 1,022,925 | France | Mar. 11, 1953 |

OTHER REFERENCES

Fuson: "Advanced Organic Chemistry," 1950, page 167.
Vul'fson et al.: C. A., 1956 (Vol. 50), page 13811.
Cawley: Abstract of application Serial Number 685,905, published Mar. 18, 1952, 656 O.G. 885.
Surrey: "Name Reactions in Organic Chemistry," 1954, pages 142–143 (Reformatsky Reaction).

UNITED STATES PATENT OFFICE
CERTIFICATE OF CORRECTION

Patent No. 3,021,355            February 13, 1962

Karl Eiter et al.

It is hereby certified that error appears in the above numbered patent requiring correction and that the said Letters Patent should read as corrected below.

Column 1, line 28, for "presence" read -- present --; line 36, below the formula insert -- Formula I --; column 3, line 16, for "33,000" read -- 33,100 --; column 4, line 22, for "si" read -- is --; line 34, for "(1(2',6',6'-" read -- (1-(2',6',6'- --.

Signed and sealed this 19th day of June 1962.

(SEAL)
Attest:

ERNEST W. SWIDER
Attesting Officer

DAVID L. LADD
Commissioner of Patents